United States Patent [19]

Chasek

[11] 4,104,630
[45] Aug. 1, 1978

[54] VEHICLE IDENTIFICATION SYSTEM, USING MICROWAVES

[76] Inventor: Norman E. Chasek, 24 Briar Brae Rd., Stamford, Conn. 06903

[21] Appl. No.: 698,468

[22] Filed: Jun. 21, 1976

[51] Int. Cl.² .............................................. G01S 9/56
[52] U.S. Cl. ........................... 343/6.5 R; 343/6.5 SS; 343/6.8 R
[58] Field of Search ......... 343/6.5 SS, 6.5 R, 6.5 LC, 343/6.8 R, 6.8 LC

[56] References Cited

U.S. PATENT DOCUMENTS

| | | | |
|---|---|---|---|
| 3,296,615 | 1/1967 | Page et al. | 343/6.5 R |
| 3,312,970 | 4/1967 | Bond | 343/6.5 R X |
| 3,691,557 | 9/1972 | Constant | 343/6.5 SS |
| 3,745,569 | 7/1973 | Works et al. | 343/6.5 SS |
| 3,918,057 | 11/1975 | Van Tol | 343/6.5 SS X |
| 4,001,822 | 1/1977 | Sterzer | 343/6.8 R X |

*Primary Examiner*—Malcolm F. Hubler

*Attorney, Agent, or Firm*—Parmelee, Johnson, Bollinger & Bramblett

[57] ABSTRACT

A vehicle identification system, using microwave, in which every vehicle to be identified has an identification panel attached to its side, containing a very low level power drain tunnel diode transponder and a digital coder plus a small battery and a resonant frequency array. Interrogating transmitter-receivers are placed at designated ground stations. For verification purposes there is a resonant reflective array printed on the identification panel to reflect back a doppler offset signal emitted by the interrogating transmitter, thereby registering that a vehicle with an identification panel has passed, even if the transponder has failed. Unlike optical scanners used for freight car identifications, this system cannot be disrupted by dirt, ice and snow. Vehicles do not have to slow down to be interrogated, and the emitted field strength from this plate is so low that F.C.C. licensing is not required. The code stored in the panel is readily programmable, if desired.

12 Claims, 12 Drawing Figures

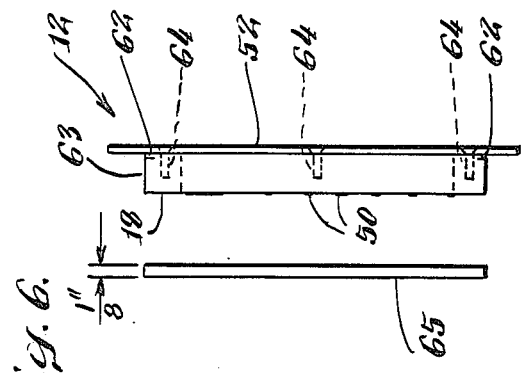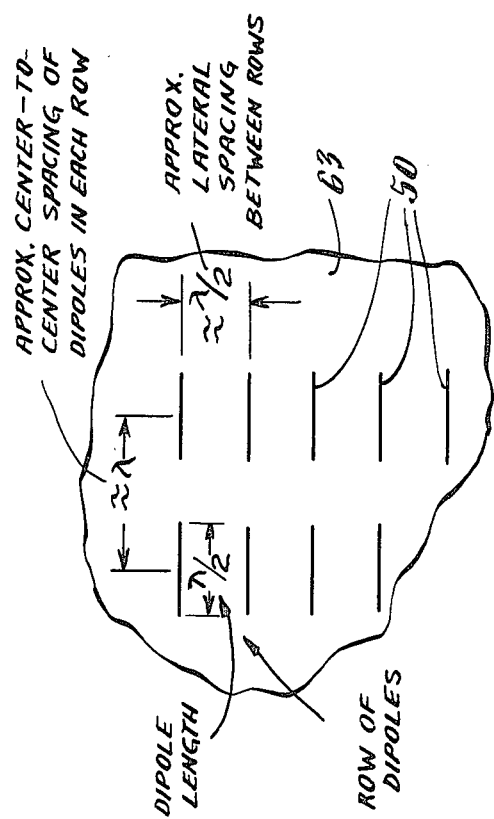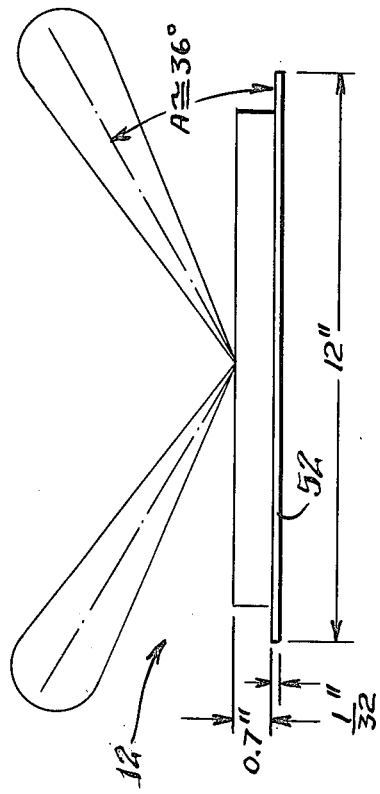

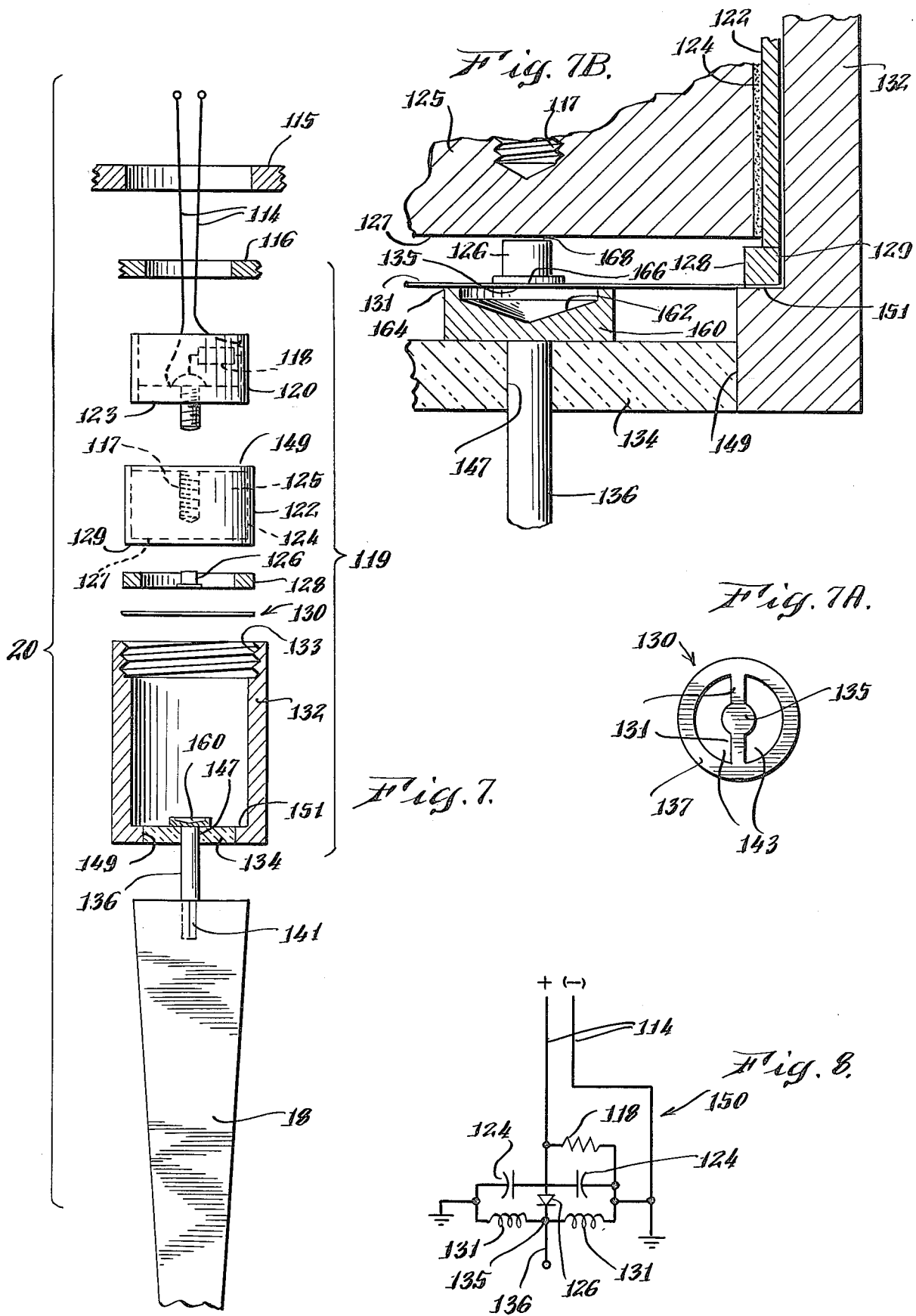

VEHICLE IDENTIFICATION SYSTEM, USING MICROWAVES

BACKGROUND OF THE INVENTION

This invention is particularly appropriate for embodiment in freight car identification system. Every freight train contains cars from many different railroads, and the respective cars may have many different destinations. An identification (I.D.) code that can be fed into a central computer facilitates the loading, unloading, accounting for, and supervising the movement of all of the freight cars in a yard or on the trackage of a system.

In order to keep track of railroad cars, freight car I.D. systems have been devised, and are in use. These existing I.D. systems use optical scanners (which identify color coded identification plates on passing freight cars.) However, these optical I.D. systems have a serious deficiency; the optical scanners become disrupted when the coded identification plates become coated with dirt or when fog, snow or rain interrupt the optical scanning path.

A microwave freight car I.D. system embodying the present invention has the advantage that it is oblivious to dirt, fog, snow and rain. This microwave I.D. system has the following additional advantages over the prior optical scan system:

(1) It is self-checking, in that indication of a freight car passing (with an identification unit) occurs independently of the transmission of a digital identification code.

(2) The train does not have to slow down for accurate identification.

(3) The distance from the train to the identification interrogation equipment is not critical.

(4) The speed of the train can be checked, as a by-product.

(5) The I.D. word generator in the panel can be programmable to provide routing and delivery information, data on vehicle contents, weight, etc.

SUMMARY OF THE INVENTION

In accordance with the present invention, a microwave signal transmitted from a fixed location is detected by a tunnel diode detector located in an identification unit attached to a vehicle. This detected signal momentarily turns on the battery power, thereby actuating a binary digital identification word generator. The binary word pulses bias the tunnel diode into an oscillitory mode for tansmitting an identification code to the receiver located at the fixed location. Simultaneously as this sequence is occurring, a doppler sensor associated with the fixed location transmitter picks up the doppler signal reflected from an efficient array of dipoles located on the identification panel. The presence of this doppler signal indicates that an identification panel is passing and an identification code should be received. This doppler signal provides a verification capability which can locate defective identification panels. The power drain of the panel is so low that a 0.5 ampere-hour battery should last ten years.

The advantages of a vehicle identification system embodying the invention will be more fully understood from a consideration of the following detailed description in conjuction with the accompanying drawings.

BRIEF DESCRIPTION OF THE DRAWINGS

In the drawings:

FIG. 5 is a top view of the identification panel showing the reflective array and the transponding antenna;

FIG. 5A is a side view of the identification panel showing beams formed by resonant dipoles and the end fire antenna.

FIG. 5B shows an enlarged section of the resonant dipole array.

FIG. 6 is an end view of the identification panel; and

FIG. 7 is an enlarged exploded view of the tunnel diode detector/oscillator which is included in the panel of FIGS. 5 and 6.

FIG. 7A is a plan view of the R.F. resonant inductor.

FIG. 7B is an enlarged sectional view taken in the vicinity of the tunnel diode.

FIG. 8 is a schematic of the tunnel diode detector/oscillator.

DETAILED DESCRIPTION OF PRESENTLY PREFERRED EMBODIMENT OF THE INVENTION

Figure 1:
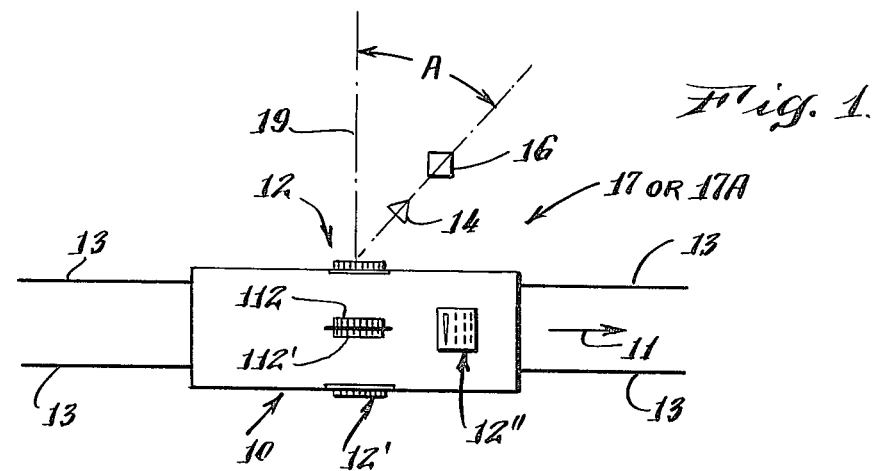
FIG. 1 is a plan view showing a vehicle in the form of a freight car, with the affixed identification panel, and the fixed location transponder is shown nearby.

FIG. 1 shows the vehicle 10 in the form of a railroad freight car moving in the direction of the arrow 11 along the tracks 13 and having a microwave identification panel 12 attached to its side. The interrogating transponder 16 is located off to one side of the tracks 13 on a post at a predetermined distance from the tracks which is in the range from 3 to 15 feet. The antenna 14 of the interrogating station 17 or 17A has a beamwidth of approximately 10° and is pointed obliquely toward the oncoming vehicle at an angle "A" of approximately a 40° angle to the side of the vehicle. At this angle an insignificant amount of re-radiation from the vehicle is reflected back into antenna 14.

Figure 2:
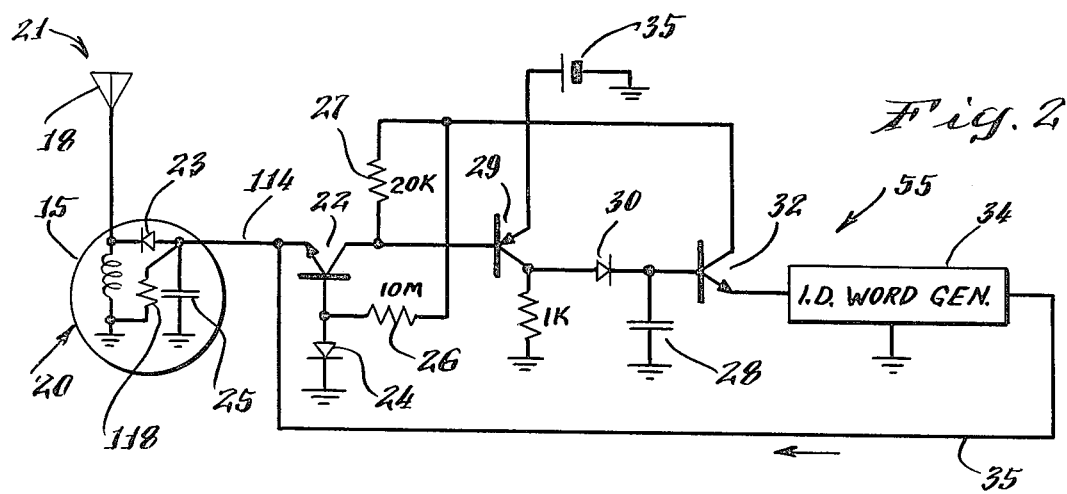
FIG. 2 is a schematic electrical circuit diagram of the identification panel.

FIG. 2 shows a schematic electrical circuit diagram of one form of the vehicle-mounted transponder 21 which is located inside of the panel 12. The antenna 18 is shown in detail in FIG. 5. Component 20 is a tunnel diode oscillating-detector stage which is shown in greater detail in FIG. 7 and which includes a tunnel diode 23 and means providing an inductor 15 and a capacitor 25 which are resonant at the microwave frequency transmitted from the antenna 14. The gain of the antenna 18 and the low level of output power from the tunnel diode oscillating detector stage 20 produces a sufficiently low level of radiated field strength so that no F.C.C. license is required. The oscillating-detector stage 20 is included in a transponder circuit 55 containing a transistor 22 which is biased by a diode 24 so that it is on the verge of drawing current. The diode 24 and transistor 22 are self compensating so that no current drain through the transistor 22 will occur over a wide temperature range in the absence of a signal input.

A resistor 26 of approximately 10 meg ohms is connected from the biasing diode 24 to a battery 35. This resistor diode combination 26, 24 draws less than one micro ampere from a 9 volt battery. This low current drain constitutes the average total current drain of the vehicle mounted transponder 21.

The tunnel diode 23 is normally at zero bias where it acts as a detector. When microwave energy is received by the antenna 18, a voltage is built up on a capacitor 25 which biases transistor 22 into conduction thereby developing a voltage drop across the resistor 27. This current is further amplified in a second transistor stage 29 which then rapidly charges up a capacitor 28 through a diode 30. The voltage build-up in capacitor 28 turns a third transistor stage 32 full on, thereby applying full voltage from the battery 35 to the binary identification word generator 34.

A digital pulse stream from I.D. word generator 34 is then applied through an output connection 35 to tunnel diode 23 causing it to be biased by capacitor 25 into an oscillatory mode for transmitting from the antenna 18 a microwave radio signal which corresponds to the digital pulse coded indentification word that is stored in the word generator 34. This same bias voltage on capacitor 25 also turns off the transistor 22, but the charge which was already built up across capacitor 28 will maintain the word generator 34 in operation for the duration of its transmission. This vehicle-mounted transponder circuit 21 is powered by battery 35, for example a 9 volt battery having a rating of approximately 0.5 ampere hours or more, if desired.

Figure 3:
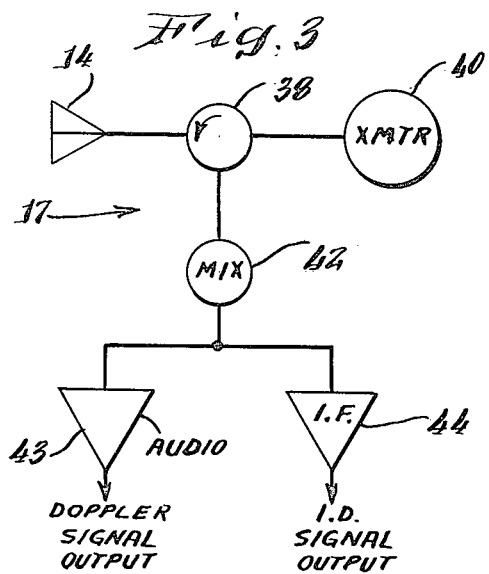
FIG. 3 is an electrical block diagram of the components in a fixed location interrogating transponder
Figure 4:
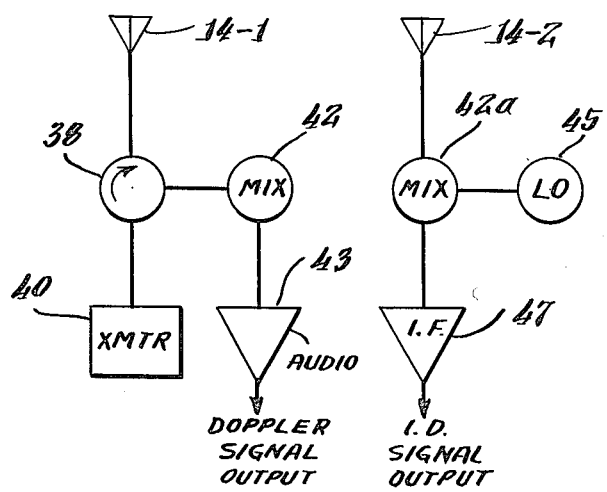
FIG. 4 shows a block diagram of an alternate embodiment of the fixed interrogating transponder.

FIGS. 3 and 4 show two interrogating transponder circuits. In FIG. 3, the interrogating transponder 17 has a directional antenna 14, for example such as a parabolic dish antenna, with a horizontal and vertical beamwidth of approximately 10°. The antenna 14 is mounted at the same height as the I.D. panels 12 on the vehicles. Thus, the antenna 14 is aimed horizontally at the oblique angle "A" (FIG. 1) to the path of the vehicle. A circulator 38 couples a mixer 42 and a transmitter 40 to the antenna 14. The transmitter is a C.W. oscillator delivering about 100 mw at a frequency in the range from 10 to 25 GHz. Mixer 42 is a single diode mixer which operates from transmitter leakage. The output of the mixer diode feeds an audio amplifier 43 which amplifies and then rectifies the doppler return received from a moving identification panel 12. The I.F. amplifier 44 is designed to match the frequency difference between C.W. frequency of the transmitter 40 and the frequency of the tunnel diode oscillator stage 20 (FIG. 2) which are sufficiently offset from each other so that the tunnel diode oscillator cannot be injection locked by the transmitter 40. For example, the frequency of the tunnel diode oscillator 20 may be 10,500 MHz and of the transmitter 10,300 MHz. The I.F. amplifier 44 is centered at this frequency difference and is sufficiently wide band to take into account any frequency drift of the T.D. oscillator 20 which might occur with time and temperature.

If injection locking causes a problem in certain types of installations, FIG. 4 illustrates an alternative interrogating transmitter-receiver station 17A which can be used including a separate local oscillator 45 for wider frequency separation between the interrogating transmitter 40 and the tunnel diode oscillator 20. This arrangement also allows the use of two separate antennas 14-1 and 14-2 which give more freedom in positioning and detailed design of these two antennas so as to optimize the two functions and hence diminish the possibility of injection locking. The transmitter 40, mixer 42 and circulator 38 in FIG. 4 are the same as those in FIG. 3, and serve to feed a doppler return signal into the audio amplifier 43.

The doppler output from the audio amplifier 43 in FIG. 3 or FIG. 4 is adapted to be fed into a verification circuit (not shown) for indicating and recording the fact that a vehicle has passed but has not responded with its identification code. For identification, the antenna 14-2 is connected to a single diode mixer 42a to which is connected the local oscillator 45. To the mixer 42a is connected an I.F. amplifier 47 which is centered at the difference between the frequency of the local oscillator 45 and the frequency of the tunnel diode oscillator stage 20. The difference in frequency between the transmitter 40 and the tunnel diode oscillator 45 can now be 1000 MHz for example and the I.F. can be centered at 100 MHz.

The output from the I.F. amplifier 44 or 47 feeds into suitable computer means (not shown) which serves to read the binary coded word for identifying the successive vehicles passing the interrogation station 17 or 17A and which includes suitable memory and read-out capability for displaying a record of the various cars and of their locations. Other similar interrogation stations at other locations in the railroad system in which the tracks 13 are included are also connected to the computer means. In this way the identity, location and movement of all of the various vehicles 10 can be monitored for improved railroad operations.

As shown in FIG. 5, the microwave identification panel 12 on the vehicle includes a plurality of spaced, parallel conductive reflector dipoles 50. The reflective dipoles, 50, are $\lambda/2$ long and are separated laterally by a spacing of $\lambda/2$ where $\lambda$ is the wavelength in the dielectric medium 65 of the interrogating signal being transmitted from the fixed station 17 or 17A. The dipoles are positioned approximately $n\lambda/2$ away from a conductive ground plane 52. The precise dimensions produce a maximum reflection at roughly 40° off a plane perpendicular to the dipoles. Thus this array of dipoles 50 acts as a tuned reflective means for producing efficient reflection of microwave energy of a predetermined frequency range to reflect such energy at a predetermined angle "A". This reflected energy is slightly shifted in frequency due to the motion of vehicle 11, thereby producing an audio beat frequency signal which is amplified by the audio amplifier 43.

The antenna 18 is attached to the tunnel diode module 20 and is approximately 8 inches long. The antenna's distance above the ground plane, 52, is optimized to best suit the specific system configuration used. The battery 35 and the transponder circuit 55 are also imbedded in the plastic material. The ground plane, 52, is a conductive layer covering the entire side of the panel that is attached to the side of the vehicle. The dipoles 50 and 18 are conductive strips of metal imbedded in a plastic dielectric material (FIG. 5) which overlies the ground plane 52.

Specifically antenna 18 consists of a tapered strip of metal foil enclosed in plastic. The taper is optimized for greatest radiation efficiency. This is an end fire antenna which has its maximum radiated field along the axis of the antenna at an angle of 36° relative to the ground plane which is provided by conductive base 52. The half wave resonant dipoles 50, are laterally spaced approximately $\lambda/2$ and are located above the ground plane by an amount that will maximize the re-radiation at an angle of approximately 36° above the ground plane and along the axis of dipoles 50. This distance is approximately $n\lambda/2$, where $n$ is selected to produce an overall height of dielectric block 63 compatible with economic considerations. The longitudinal separations of the dipoles is approximately $\lambda$, from center to center.

The precise separation will effect the angle of most efficient re-radition.

The dimensions shown in FIG. 5 and 6 are for an operating frequency of 10.3 GHz.

The ground plane 52 is a 1/32 inch steel plate onto which is bolted by machine screws 64 and sealed with gasket 62, a molded polystyrene block 63 with a compartment 59 formed for batteries 35 and circuitry 35. The antenna elements 18 and 50, consisting of thin strips of metal foil, are bonded with adhesive to the top of block 63 and a cover sheet of polystyrene 65 is bonded with adhesive to the top of block 63 to seal the unit and protect the antenna elements.

The tunnel diode detector/oscillator shown as item 20 in FIG. 2 is shown in detail in FIGS. 7, 7A, 7B and 8. Cylindrical casing 132 contains an output/input probe coupler 136 which extends through the central hole 147 in a ceramic window 134. This probe coupler connects to antenna 18 shown in FIG. 5. This connection is made by a slit 141 in probe coupler 136 which then slips onto dipole 18. This ceramic window pane 134 has a metallized coating around its central hole 147 to which the probe coupler 136 is soldered. Also, the periphery of the ceramic window is metallized and is soldered to a port 149 in the end wall 151 of the cylindrical casing 132. Into this casing 132 goes a tuning strap inductor member 130 (see also FIG. 7A), a conductive spacer ring 128, and a tunnel diode 126.

The radio frequency (R.F.) sub-assembly 119 for the tunnel diode 126 includes an R.F. bypass capacitor 124 formed by a cylinder of conductive metal 125 coated with a thin dielectric layer 124 with an outer annular conductive cylindrical sleeve 122 pressed over this dielectric layer 124. For example, the metal cylinder element 125 may be aluminum with an anodized coating 124 on its cylindrical periphery. An alternative way in which to form the thin dielectric layer 124 is to use a very thin sleeve of low-loss insulating plastic, for example, such as the fluorocarbon resin plastic obtainable commercially under the trademark "Teflon", which is then sandwiched between the conductive cylinder element 125 and the sleeve 122.

The outside diameter (O.D.) of the sleeve 122 is slightly smaller than the inside diameter (I.D.) of the casing 132 so that this sleeve 122 can slide into the casing 132. Also, the lower rim 129 of the sleeve 122 extends down slightly beyond the flat lower end 127 of the conductive element 125 so that the conductive spacer ring 128 does not inadvertently shortcircuit the capacitor 124. The upper rim 149 of sleeve 122 extends up beyond the element 125 so that the housing 120 can not touch the cylindrical element 125.

The tunnel diode 126 is inserted and held in position between the flat lower end 127 of the cylinder element 125 which acts as a ground plane and the central portion 135 (FIG. 7A) of the resonant tuning inductor member 130, which is spaced from this ground plane by the spacer ring 128. This ring 128 presses the circular rim 137 of the inductor member 130 down upon the end wall 151 of the doppler module casing 132. Thus, the outer ends of the inductor strap 131 are grounded to the casing 132 and are grounded to the ring 128.

There is a cylindrical resistor housing 120 having a d.c. stabilizing resistor 118 mounted therein. The resistor has one of its leads secured to a terminal screw 121, and the other lead is soldered to the inner surface of the cylindrical housing 120. Thus, this resistor 118 is in circuit in parallel with the capacitor 124, being shunted between one terminal 168 of the diode 126 and ground. This resistor may, for example, have a resistance value in the range from 10 to 50 ohms. The terminal screw 121 may be held by an insulating washer 123 if desired, or this washer may be omitted, the screw being threaded into an axial socket 117 in the conductive cylindrical element 125. Also attached by this terminal screw is one of the leads 114 to transponder circuit 55. The other lead 114 is secured to the interior of the cylindrical housing by soldering.

In the doppler module sub-assembly 119, the cylindrical housing 120 abuts against the cylindrical sleeve 122 which in turn abuts against the spacer ring 128 resting on the circular rim 137 seated on the end wall 151. A ring nut 116 screws down into the threaded region 133 in the upper end of the module casing 132 for pressing and locking the conductive components, 120, 122, 128, 137 and 151 firmly together.

As shown enlarged in cross section in FIG. 7B the probe coupler 136 has an enlarged head 160 which has a cup shaped top surface 162. The enlarged central portion 135 of the inductor strap 131 rests upon the rim 164 and spans over the cup 162. The tunnel diode 126 generally has an inverted top hat configuration with conductive terminal surfaces 166 and 168 on its bottom and top. The conductive cylindrical element 125 presses down on the terminal surface 168, while the resilient central portion 135 of the inductor strap acts like a dished spring element pressing firmly and resiliently up against the other terminal surface 166, thereby maintaining good electrical contract with both ends of the tunnel diode 126 in spite of any expansion or contraction due to ambient temperature changes.

In FIG. 8 is a schematic electrical circuit diagram showing the oscillator/mixer circuit 150 with the tunnel diode 126 in connection with the mid-point of the inductor 131 formed by the diametrically extending conductive strap 131 (FIG. 7A) of the tuning strap member 130. The terminal 166 of diode 126 seats against the enlarged central region 135 of this strap. The terminal screw 121, the positive lead 114 and the resistor 118 are electrically connected through the cylindrical element 125 to the terminal 168 of the diode 126, while the lower end of the diode is connected to the other (ground) lead 114 through the inductor strap 131.

The inductor strap 131 and capacitor 124 act as a resonant circuit which determines the frequency of oscillation of the tunnel diode oscillator circuit 150. This frequency can be tuned by shaping the tuning strap member 130 (FIG. 7A). Namely, the longer and thinner that the inductor strap 131 is made and the larger that the semi-circular openings 143 are made, then lower the frequency of the microwave energy to be generated, and vice versa.

The following components are made of suitable conductive and readily machinable metal, for example of brass: doppler module casing 132, sleeve 122, spacer ring 128, housing 120, screw 121, and ring nuts 115 and 116. The tuning strap member 130 may advantageously be made of very resilient metal having a highly conductive surface for example such as gold-plated spring steel. The interior of the casing 132, end wall 151 and spacer ring 128 may be gold-plated to provide high conductivity. The following components are made of low loss dielectric material, for example of ceramic: window 134 and insulating washer 123.

Although the tunnel diode 126 is shown with its negative terminal 166 in connection with the mid-point 135 of the inductor strap 131, it is to be understood that this diode can be installed in an inverted position, namely, with its positive terminal in connection with said midpoint. In this latter case the polarity of the leads 114 is reversed. Furthermore, tunnel diodes of other mechanical configuration can be inserted into this assembly.

FIG. 2 shows the tunnel doide as 23, the resonant inductor as 15 and the bypass capacitor as 25. The components correspond to FIGS. 7 and 8 in which 126 is the tunnel diode, 131 is the inductor and 124 is the bypass capacitor, and 118 is the stabilizing resistor. The connections 114 in FIGS. 7 and 8 provide connection with the transponder circuit 55 of FIG. 2, one of these connections being a common ground.

The predetermined oblique (acute) angle A (FIG. 1) at which the interrogating transponder antenna 14 of 14-1 and 14-2 is aimed preferably corresponds with the predetermined oblique (acute) angle A (FIG. 5A) to the ground plane 52 at which occurs the maximum intensity of the reflected energy from the array of dipoles 50, for example, this acute angle may be in the range from approximately 30° to approximately 45° and in this illustrative embodiment is approximately 36° to 40°.

As mentioned above, the Doppler signal output in FIGS. 3 and 4 is fed into a verification circuit for indicating and recording the fact that a vehicle has passed. This Doppler signal output may also be fed into a circuit for calculating and recording the speed at which the vehicle was passing the fixed station 17 or 17A.

It is to be understood that as used herein the word "vehicle" is intended to be interpreted broadly. For example the vehicle 10 may be a rapid transit car or it may be a truck or a trailer truck on a roadway 13 or it may be a container moving along on a conveyor track 13 or a container being carried along a roadway track 13, for example such as the containers adapted to be placed on shipboard or other containers.

The identification word generator 34 shown in FIG. 2 may be programmable, for example by use of plug-in modules or by use of magnetic strips or punch cards which can be slid into a slot in the word generator. The programmable information may include identification data for the vehicle and for its contents, net weight and gross weight of the vehicle plus contents, routing information and instructions for shipping and delivery, data about time of departure, intended time of arrival, and so forth. If desired the identification code for the vehicle may be unchangeable, while the remaining data are programmable. The coded information may include error-correcting codes for automatically detecting that an error has been made.

It is to be understood that a second panel 12' may be mounted on the opposite side of the vehicle 10. Alternatively, two of the panels 12 may be mounted back-to-back beneath or above the vehicle 10, as shown at 112 and 112'. Such a dual-sides back-to-back panel is mounted with its plane extending vertical and being positioned parallel with the longitudinal centerline of the vehicle 10 above or below the vehicle so that the dual unit can be "seen" and interrogated by a fixed station from either side of the tracks.

Also, it is to be understood that a panel can be mounted as shown at 12" in a horizontal plane and positioned with dipoles 50 and antenna 18 being perpendicular to the longitudinal center-line of the vehicle 10. Panel 12" may be mounted above the vehicle, preferably near the middle of the vehicle so that the panel 12" can be "seen" and interrogated by a fixed station located at either side of the tracks looking downward at an oblique (acute) angle toward panel 12".

I claim:

1. A vehicle identification system comprising:
    a panel adapted to be mounted on a vehicle including tuned reflective means for directionally reflecting microwave energy in a predetermined frequency range,
    said panel also including transponder means comprising an antenna tuned to said predetermined frequency range, a digital coder, and a transponder circuit interconnecting said antenna and said fixed or adjustable coder for transmitting a coded signal upon reception by said antenna of microwave energy in said predetermined frequency range,
    an interrogating station including directional antenna means adapted to be aimed at a passing vehicle,
    transmitter means for transmitting microwave energy in said frequency range from said directional antenna means,
    a circulator interconnecting said antenna means and said transmitter, and
    a mixer and audio amplifier means also connected to the mixer for producing and amplifying a doppler beat frequency signal resulting from microwave energy reflected by the tuned reflective means on a passing vehicle for verifying that a vehicle is passing, irrespective of the operation of said transponder means, and
    said interrogating station also including intermediate frequency amplifier means for amplifying a coded intermediate frequency signal resulting from transmission of a coded signal by said transponder means for vehicle identification.

2. A vehicle identification system as claimed in claim 1, in which:
    said intermediate frequency amplifier means is centered at the frequency difference between the predetermined frequency of said transmitter means and the frequency of the coded signal from said transponder means.

3. A vehicle identification system as claimed in claim 1, in which:
    said interrogation station includes a local oscillator, and
    said intermediate frequency amplifier means is centered at the frequency difference between the frequency of said local oscillator and the frequency of the coded signal from said transponder means.

4. A vehicle identification system as claimed in claim 1, in which:
    said transponder circuit includes electrical battery means,
    a tunnel diode oscillating-detector including resonant means which are resonant at the predetermined frequency range of the signal being transmitted by said transmitter means through said directional antenna means,
    a transistor stage connected between said tunnel diode oscillating-detector and said battery means, and
    circuit means for normally biasing said transistor stage into non-conduction in the absence of reception of a signal in said predetermined frequency range, said tunnel diode oscillating-detector and resonant means serving to bias said transistor stage into conduction.

5. A vehicle identification system as claimed in claim 4, in which:
    said digital coder is a binary identification word generator, and
    said transponder means include circuit means interconnecting said generator, said battery means and said transistor stage for turning on said generator when said transistor stage is biased into conduction, and
    said generator having an output circuit connected to said tunnel diode oscillating-detector for transmitting a coded signal upon the energization of said generator.

6. A vehicle identification system as claimed in claim 5, in which:
    said transponder means includes a storage capacitor for maintaining the energization of said generator for a sufficiently long time to complete the transmission of the fully binary coded word even though said transistor stage may become non-conducting when transmission of a coded signal begins.

7. A vehicle identification system as claimed in claim 1, in which:
    said tuned reflective means in said panel comprises a plurality of spaced parallel rows of dipoles uniformly spaced from a conductive plane, the spacing between said dipole antennas and said plane being approximately $n\lambda/2$, and the lateral spacing between rows of respective dipoles being approximately $\lambda/2$, and said dipoles each having a length of $\lambda/2$ ($\lambda$ being the wavelength of the signal in said predetermined frequency range being transmitted from said directional antenna means).

8. A vehicle identification system as claimed in claim 7, in which:
    said dipoles are protected by enclosing in a low-loss plastic dielectric material covering said conductive plane.

9. A vehicle identification system as claimed in claim 8, in which:
    said transponder means are also protected by enclosure in said plastic dielectric material.

10. A vehicle identification system as claimed in claim 7, in which,
    each of said rows includes multiple dipoles the dipoles in each range being longitudinally spaced center-to-center by a spacing of approximately $\lambda$, said dipoles are covered with a protective cover of dielectric material, and $p_1 \lambda$ is the wavelength of the signal in said dielectric cover material.

11. A vehicle identification system comprising:
    tuned reflective means adapted to be mounted on a vehicle for directionally reflecting microwave energy in a predetermined frequency range,
    transponder means adapted to be mounted on the vehicle comprising an antenna tuned to said predetermined frequency range, a digital coder, and a transponder circuit interconnecting said antenna and said coder for transmitting a coded signal upon reception by said antenna of microwave energy in said predetermined frequency range,
    an interrogating station including directional antenna means adapted to be aimed at a passing vehicle,
    transmitter means for transmitting microwave energy in said frequency range from said directional antenna means,
    a mixer,
    a circulator interconnecting said directional antenna means and said transmitter and said mixer for producing a doppler beat frequency signal resulting from such transmitted microwave energy having been reflected by the tuned reflective means on a passing vehicle,
    audio amplifier means connected to said mixer for amplifying said doppler beat frequency signal for verifying that a vehicle is passing, irrespective of the operation of said transponder means, and
    said interrogating station also including intermediate frequency amplifier means for amplifying a coded intermediate frequency signal resulting from transmission of a coded signal by said transponder means for vehicle identification.

12. A vehicle identification system as claimed in claim 11, in which:
    said tuned reflective means comprises a plurality of spaced parallel rows of dipole antennas uniformly spaced from a conductive plane, the spacing between said dipole antennas and said plane being approximately $n\lambda/2$, and the lateral spacing between rows of respective dipole antennas being approximately $\lambda/2$, said dipole antennas each having a length of approximately $\lambda/2$, and said dipole antennas in each row having a center-to-center spacing of approximately $\lambda$, wherein $\lambda$ is the incident wavelength of the signal in said predetermined frequency range being reviewed from said interrogating station.

* * * * *